US012273046B2

(12) United States Patent
Luo et al.

(10) Patent No.: US 12,273,046 B2
(45) Date of Patent: Apr. 8, 2025

(54) HYBRID VOLTAGE REGULATOR ARCHITECTURE

(71) Applicant: Dell Products L.P., Round Rock, TX (US)

(72) Inventors: Shiguo Luo, Austin, TX (US); Guangyong Zhu, Austin, TX (US); Lei Wang, Austin, TX (US); Feng-Yu Wu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 18/076,996

(22) Filed: Dec. 7, 2022

(65) Prior Publication Data

US 2024/0195322 A1  Jun. 13, 2024

(51) Int. Cl.
| | | |
|---|---|---|
| H02M 1/00 | (2007.01) | |
| G06F 1/26 | (2006.01) | |
| H02M 3/158 | (2006.01) | |
| H02M 7/537 | (2006.01) | |

(52) U.S. Cl.
CPC ............. *H02M 7/537* (2013.01); *G06F 1/26* (2013.01); *H02M 1/0043* (2021.05); *H02M 3/1586* (2021.05)

(58) Field of Classification Search
CPC .... H02M 1/0064; H02M 1/0084; H02M 1/14; H02M 1/15; H02M 1/0095; H02M 3/158; H02M 3/1584–1586; H02M 3/1588; H02M 3/1566; H02M 3/04
See application file for complete search history.

(56) References Cited

U.S. PATENT DOCUMENTS

| | | | | |
|---|---|---|---|---|
| 7,233,132 B1 * | 6/2007 | Dong | ................... | H02M 3/1584 |
| | | | | 323/272 |
| 7,315,463 B2 * | 1/2008 | Schrom | ................... | H01F 37/00 |
| | | | | 363/148 |
| 7,449,867 B2 * | 11/2008 | Wu | ...................... | H02M 3/1584 |
| | | | | 323/272 |

(Continued)

OTHER PUBLICATIONS

"Fast multi-phase trans-inductor voltage regulator" from Defense Publication Series (Year: 2019).*

*Primary Examiner* — Sean Kayes
*Assistant Examiner* — Nusrat Quddus
(74) *Attorney, Agent, or Firm* — Larson Newman, LLP (57) ABSTRACT

A voltage regulator includes a first portion with a first converter phase and a second portion with second and third converter phases, and a compensation inductor. The first converter phase receives an input voltage and provides an output voltage through a first inductor. The second converter phase receives the input voltage and provides the output voltage through a first primary winding of a first coupled inductor. The first coupled inductor includes a first secondary winding magnetically coupled to the first primary winding. The third converter phase receives the input voltage and provides the output voltage through a second primary winding of a second coupled inductor. The second coupled inductor includes a second secondary winding magnetically coupled to the second primary winding. The compensation inductor, first secondary winding, and of the second secondary winding are coupled in series between a ground plane.

20 Claims, 5 Drawing Sheets

(56) References Cited

U.S. PATENT DOCUMENTS

| | | | | |
|---|---|---|---|---|
| 7,667,440 B2* | 2/2010 | Qiu | H02M 3/1584 | |
| | | | 323/262 | |
| 7,791,321 B2* | 9/2010 | Xu | H02M 3/1584 | |
| | | | 323/361 | |
| 8,294,438 B2* | 10/2012 | Wickersham | H02M 3/1584 | |
| | | | 323/237 | |
| 8,704,500 B2* | 4/2014 | Xiao | H02M 3/1584 | |
| | | | 323/272 | |
| 8,860,390 B2* | 10/2014 | Tam | H02M 3/1588 | |
| | | | 323/272 | |
| 9,041,504 B2* | 5/2015 | Helmreich | H02M 3/1584 | |
| | | | 336/170 | |
| 9,379,619 B2* | 6/2016 | Barnette | H02M 3/1584 | |
| 9,618,539 B2* | 4/2017 | Barnette | G01R 15/146 | |
| 10,003,266 B2* | 6/2018 | Breen | H02M 3/1584 | |
| 10,122,269 B2* | 11/2018 | Gozzini | H02M 3/156 | |
| 11,303,204 B1* | 4/2022 | Zhao | H02M 1/0043 | |
| 11,451,145 B2* | 9/2022 | Shao | H02M 1/0077 | |
| 11,476,763 B2* | 10/2022 | Chang | H02M 1/0064 | |
| 11,641,163 B2* | 5/2023 | Capetillo | H02M 1/0009 | |
| | | | 363/16 | |
| 11,876,445 B2* | 1/2024 | Zhou | H02M 3/155 | |
| 11,979,081 B2* | 5/2024 | Jong | H02M 3/1582 | |
| 12,159,738 B2* | 12/2024 | Nan | H01F 27/06 | |
| 2002/0136029 A1* | 9/2002 | Ledenev | G06F 1/26 | |
| | | | 363/16 | |
| 2008/0067990 A1* | 3/2008 | Wei | H01F 27/2804 | |
| | | | 336/212 | |
| 2014/0344600 A1* | 11/2014 | Breen | G06F 1/26 | |
| | | | 713/323 | |
| 2017/0248996 A1* | 8/2017 | Zhang | G06F 1/26 | |
| 2018/0034374 A1* | 2/2018 | Breen | G06F 9/4403 | |
| 2018/0302077 A1* | 10/2018 | Navarro Castillo | H03K 7/08 | |
| 2019/0372454 A1* | 12/2019 | Rainer | H02M 3/335 | |
| 2022/0109368 A1* | 4/2022 | Zhou | H02M 3/1586 | |
| 2022/0415558 A1* | 12/2022 | Nan | H02M 3/003 | |
| 2023/0057705 A1* | 2/2023 | You | H02M 3/1582 | |
| 2023/0253146 A1* | 8/2023 | Miao | H01F 27/292 | |
| | | | 336/221 | |
| 2024/0333160 A1* | 10/2024 | Shen | H02M 1/32 | |
| 2024/0396447 A1* | 11/2024 | Jiang | H02M 3/155 | |
| 2024/0405659 A1* | 12/2024 | Ahmed | H02M 1/0048 | |
| 2024/0405678 A1* | 12/2024 | Nishimoto | H02M 1/14 | |

* cited by examiner

HYBRID VOLTAGE REGULATOR ARCHITECTURE

FIELD OF THE DISCLOSURE

This disclosure generally relates to information handling systems, and more particularly relates to providing a hybrid voltage regulator architecture.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A voltage regulator may include a first portion with a first converter phase and a second portion with second and third converter phases, and a compensation inductor. The first converter phase may receive an input voltage and provides an output voltage through a first inductor. The second converter phase may receive the input voltage and provides the output voltage through a first primary winding of a first coupled inductor. The first coupled inductor may include a first secondary winding magnetically coupled to the first primary winding. The third converter phase may receive the input voltage and provides the output voltage through a second primary winding of a second coupled inductor. The second coupled inductor may include a second secondary winding magnetically coupled to the second primary winding. The compensation inductor, first secondary winding, and of the second secondary winding may be coupled in series between a ground plane.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
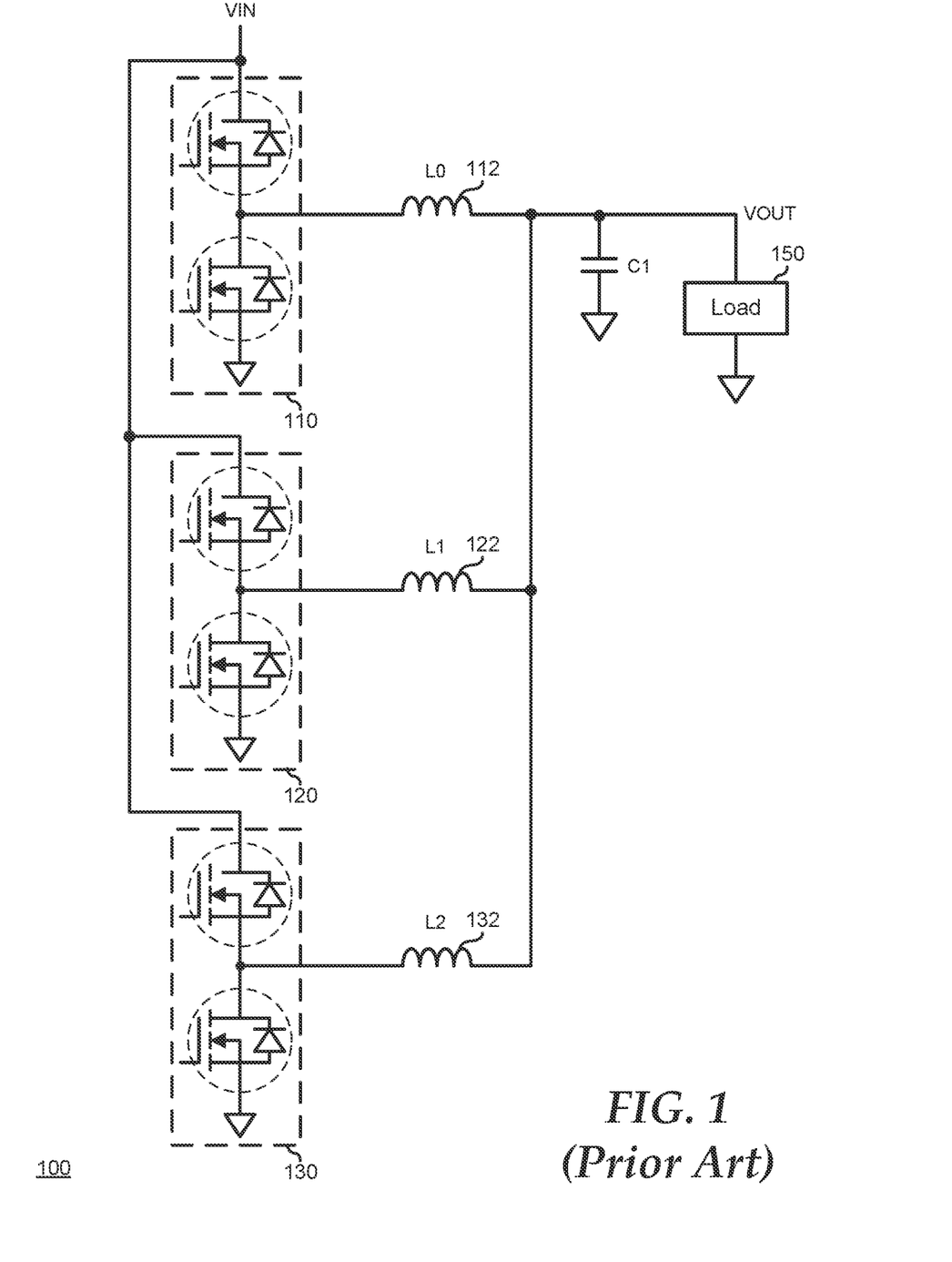
FIG. 1 is a block diagram of a conventional voltage regulator according to the prior art.

FIG. 1 illustrates a voltage regulator (VR) 100 as may be known in the art. VR 100 is a three-phase VR including converter phases 110, 120, and 130. VR 100 is configured to receive input power at an input voltage (VIN) and to convert the voltage level of the input voltage (VIN) to an output voltage level of an output voltage (VOUT) to power a load 150. Converter phases 110, 120, and 130 each receive the input voltage (VIN) and provide an output current to load 150. Each of converter phases 110, 120, and 130 provides its current through a respective inductor 112, 122, and 132, and a bulk capacitor C1, in order to reduce switching transients in the output voltage level (VOUT). In a particular embodiment, inductors 112, 122, and 132 may be provided in the range of 50-1000 nH, as needed or desired to meet the overall power requirements of VR 100. VR 100 represents a common configuration for VRs for high-speed circuit devices, such as for central processing units (CPUs), because the VR represents a simple design that does not consume a large amount of real estate on a motherboard, and because they have a relatively high conversion efficiency. However, VR 100 typically has a low dynamic power delivery capability. That is, the ability to ramp up or down the output current in the face of rapid changes in the demand from load 150 is limited in VR 100.

Figure 2:
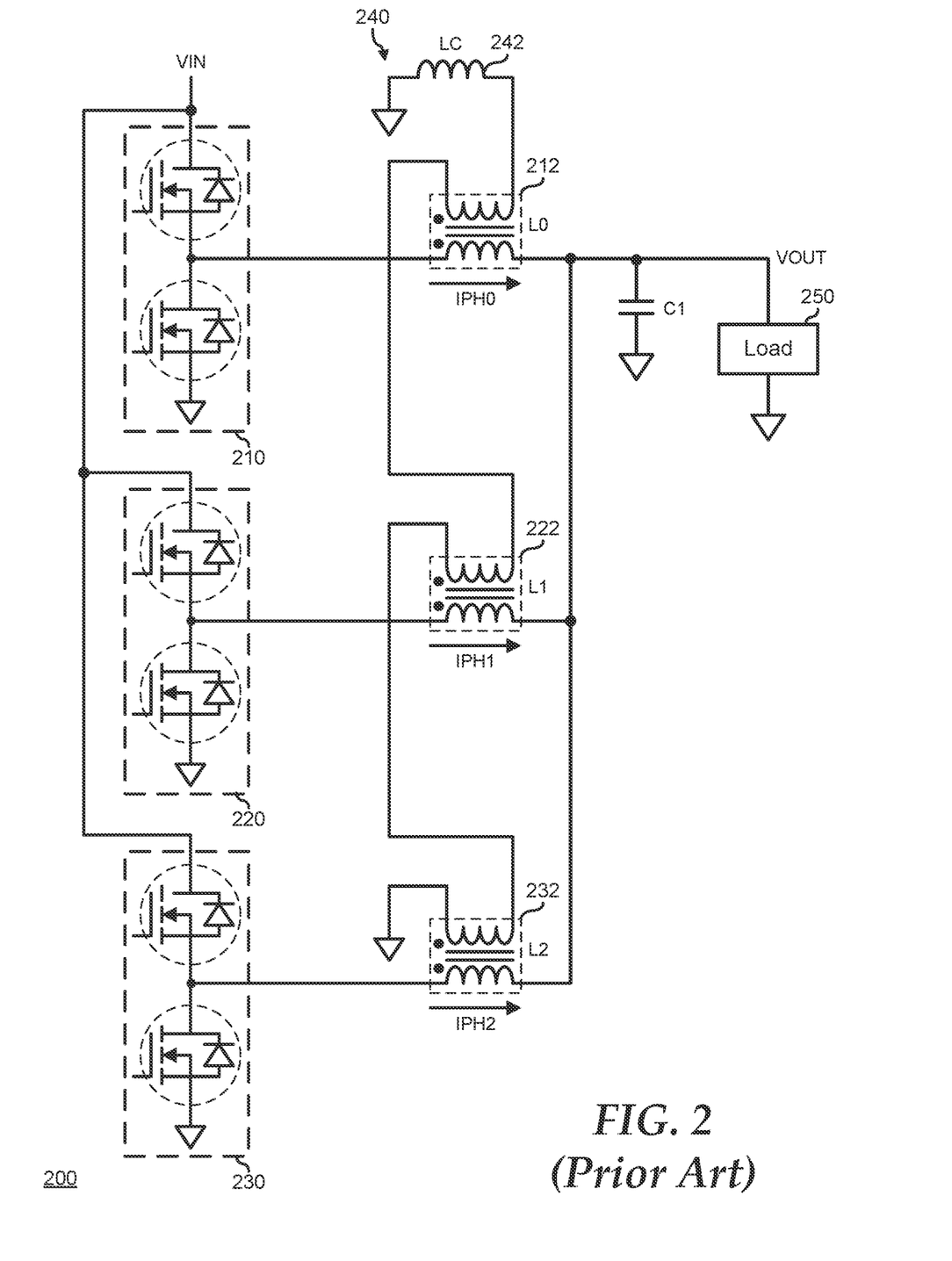
FIG. 2 is a block diagram of a trans-inductor voltage regulator according to the prior art.

FIG. 2 illustrates a trans-inductor VR (TLVR) 200 as may be known in the art. TL VR 200 is a three-phase VR including converter phases 210, 220, and 230, and a trans-inductance circuit 240. TLVR 200 is configured to receive input power at an input voltage (VIN) and to convert the voltage level of the input voltage (VIN) to an output voltage level of an output voltage (VOUT) to power a load 250. Converter phases 210, 220, and 230 each receive the input voltage (VIN) and provide an output current to load 250. In a VR without a trans-inductance circuit, each converter phase provides its current through an associated inductor, and a bulk capacitor C1, in order to reduce switching transients in the output voltage level (VOUT). Trans-inductance circuit 240 is provided which includes compensation inductor 242, and tightly coupled inductor 212, 222, and 232, each associated with a respective converter phase 210, 220, and 230. In particular, converter phase 210 provides its output current (IPH0) through a primary winding of inductor phase 212, converter phase 220 provides its output current (IPH1) through a primary winding of inductor phase 222, and converter phase 230 provides its output current (IPH2) through a primary winding of inductor phase 232. In a particular embodiment, coupled inductors 212, 222, and 232 provide a coupling coefficient of 0.95 or greater.

Trans-inductance circuit 240 is configured such that a first terminal of compensation inductor 242 is connected to ground, a second terminal of the compensation inductor is connected to a first terminal of a secondary winding of coupled inductor 212, a second terminal of the secondary winding of coupled inductor 212 is connected to a first terminal of a secondary winding of coupled inductor 222, a second terminal of the secondary winding of coupled inductor 222 is connected to a first terminal of a secondary winding of coupled inductor 232, and a second terminal of the secondary winding of coupled inductor 232 is connected to ground to complete the circuit. In a particular embodiment, compensation inductor 242 has an inductance of 250 nanoHenries (nH), and coupled inductors 212, 222, and 232 have matched primary and secondary windings of 200 nH.

In other embodiments, compensation inductor 242 and the primary and secondary windings of coupled inductors 212, 222, and 232 may be provided in the range of 50-1000 nH, as needed or desired to meet the overall power requirements of TLVR 200. Moreover, the primary and secondary windings of coupled inductors 212, 222, and 232 may have mis-matched values as needed or desired to meet the overall power requirements of TLVR 200. With the inclusion of trans-inductance circuit 240, TL VR 200 is characterized as having an extremely fast dynamic response. Such a high dynamic response may be required in response to the increasing requirements imposed by various processor manufacturers for their associated processors. However, VR 200 necessitates a larger footprint on the motherboard due to the presence of coupled inductors 212, 222, and 232, and has a lower conversion efficiency than VR 100.

Figure 3:
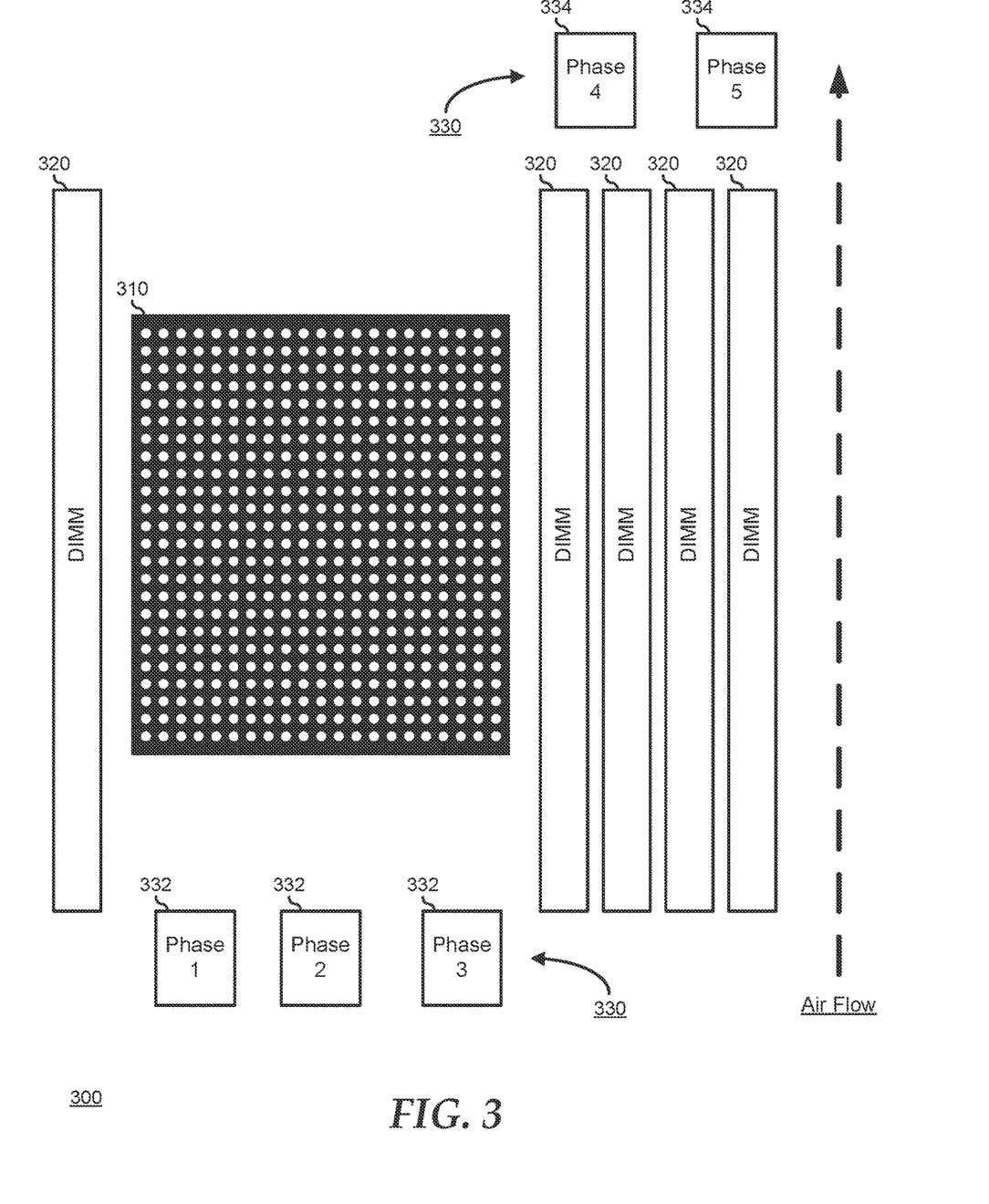
FIG. 3 is a block diagram of an information handling system according to an embodiment of the current disclosure.

FIG. 3 illustrates an information handling system 300 including a CPU 310, dual in-line memory modules (DIMMs) 320, and a VR 330 including one or more converter phase 332 on a "south" side of the CPU (that is, on a side of the CPU that is upstream in an airflow provided by system cooling fans of the information handling system), and one or more converter phase 334 on a "north" side of the CPU (that is, on a side of the CPU that is downstream in the airflow). Information handling system 300 represents a design layout that is typically very tightly constrained by the manufacturers of CPUs as to layout, configuration, trace parameters, thermal performance, voltage regulation to CPU 310, and the like. In particular, the layout of DIMMs 320 and converter phases 332 with respect to the location of CPU 310 is typically defined in one or more CPU-related specifications, and are highlighted to the manufacturers that use the CPU in a Customer Reference Board (CRB) that provides an exemplary system layout that satisfies the various specifications.

Increasingly, CPU manufacturers are specifying the use of TLVR topologies in the provision of power rails (VCCIN) to the CPU. Moreover, in order to meet the rapidly changing power demand from the CPU, the VR specifications dictate that CPU VRs with multiple converter phases are required, and that the converter phases are located on different portions of the motherboard surrounding the CPU. Thus, as illustrated, information handling system 300 includes three (3) converter phases 332 on the south side of CPU 310, and two (2) converter phases 334 on a north side of the CPU. The illustration of five (5) converter phases (that is, three (3) converter phases 332 and two (2) converter phases 334), is exemplary, and that a greater number of converter phases or a smaller number of converter phases may be utilized in a CPU VR, as needed or desired. In a particular embodiment, an information handling system may include eight (8) converter phases for the CPU, where five (5) of the converter phases are on the south side of the CPU and three (3) of the converter phases are on the north side of the CPU.

The inventors of the current disclosure have recognized that converter phases 334 are subject to much temperatures than converter phases 332. In particular, converter phases 332, being on the south side of CPU 310, are subjected to a cooler airflow, being closer to the cooling fans of information handling system 300. On the other hand, converter phases 334 reside northward of CPU 310 and DIMMs 320, and thus receive a hotter airflow. In addition, converter phases 332 are in a location with a relatively less constrained airflow, while converter phases 334 are in a location where the airflow is partially blocked by CPU 310 and the associated CPU heat sink, and by DIMMs 320. In particular, it has been observed that converter phases 334 typically run 15-30 C higher than converter phases 332.

Moreover, as noted above with regard to FIGS. 1 and 2, VRs that are designed with a TLVR topology, as shown in FIG. 2, are less efficient than conventional VRs like those shown in FIG. 1. In particular, it has been observed that a TLVR may be greater than 0.5% less efficient than conventional VRs. This is observed even using higher inductance and larger size (20%) transinductance inductors, which themselves consume more real estate on the motherboard, and further constrict the airflow. Thus, satisfying the typical design requirement for CPU voltage regulation to utilize TLVR topologies may result in reduced efficiency, higher board congestion, higher temperatures, and higher costs.

Figure 4:
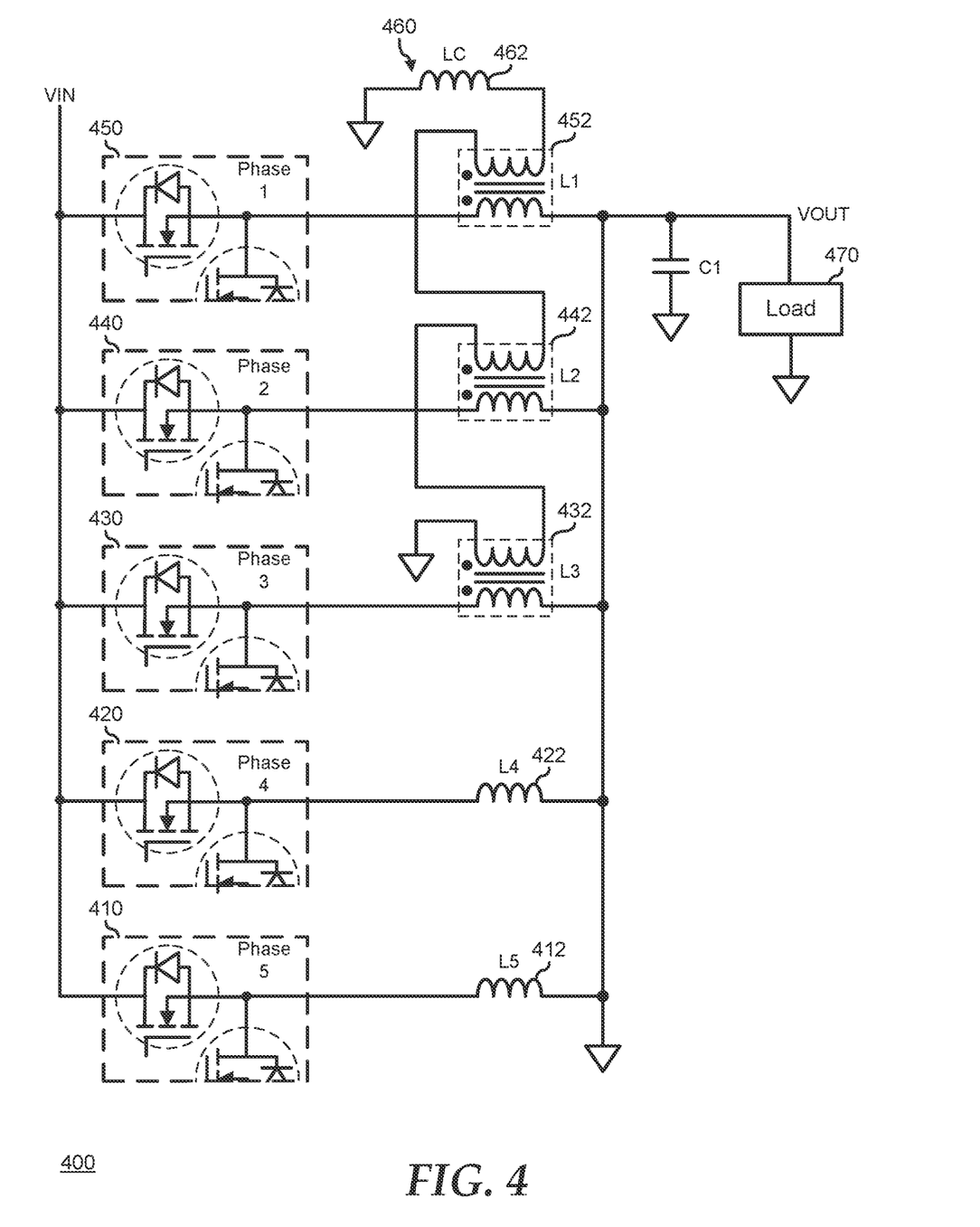
FIG. 4 is a block diagram of a voltage regulator according to an embodiment of the current disclosure.

FIG. 4 illustrates a VR 400 according to a particular embodiment. VR 400 is a five-phase VR including converter phases 410, 420, 430, 440, and 450, and a trans-inductance circuit 460. VR 400 is configured to receive input power at an input voltage (VIN) and to convert the voltage level of the input voltage (VIN) to an output voltage level of an output voltage (VOUT) to power a load 470. Converter phases 410, 420, 430, 440, and 450 each receive the input voltage (VIN) and provide an output current to load 470. VR 400 is a hybrid VR, with converter phases 410 and 420 configured without a trans-induction circuit. In particular, converter phases 310 and 320 each receive the input voltage (VIN) and provide an output current to load 470. Each of converter phases 410 and 420 provides its current through a respective inductor 412 and 422, and a bulk capacitor C1. In a particular embodiment, inductors 412 and 422 may be provided in the range of 50-1000 nH, as needed or desired to meet the overall power requirements of VR 400.

Converter phases 430, 440, and 450 are configured in a trans-inductance topology. Trans-inductance circuit 460 includes a compensation inductor 462, and tightly coupled inductors 432, 442, and 452, each associated with a respective converter phase 430, 440, and 450. In particular, converter phase 430 provides its output current through a primary winding of inductor phase 432, converter phase 440 provides its output current through a primary winding of inductor phase 442, and converter phase 450 provides its output current through a primary winding of inductor phase 452. In a particular embodiment, coupled inductors 432, 442, and 452 provide a coupling coefficient of 0.95 or greater.

Trans-inductance circuit 460 is configured such that a first terminal of compensation inductor 462 is connected to ground, a second terminal of the compensation inductor is connected to a first terminal of a secondary winding of coupled inductor 452, a second terminal of the secondary winding of coupled inductor 452 is connected to a first terminal of a secondary winding of coupled inductor 442, a second terminal of the secondary winding of coupled inductor 442 is connected to a first terminal of a secondary winding of coupled inductor 432, and a second terminal of the secondary winding of coupled inductor 432 is connected to ground to complete the circuit. In a particular embodiment, compensation inductor 462 has an inductance of 150 nanoHenries (nH), and coupled inductors 432, 442, and 452 have matched primary and secondary windings of 120 nH.

In other embodiments, compensation inductor 462 and the primary and secondary windings of coupled inductors 432, 442, and 452 may be provided in the range of 50-1000 nH, as needed or desired to meet the overall power requirements of VR 400. Moreover, the primary and secondary windings of coupled inductors 432, 442, and 452 may have mismatched values as needed or desired to meet the overall power requirements of VR 400. With the inclusion of trans-inductance circuit 460, VR 400 is characterized as having an extremely fast dynamic response on converter phases 430, 440, and 450, and particularly the dynamic response is sufficient to satisfy the needs of the associated CPU.

In this way, considering FIG. 3, converter phases 410 and 420 may be applied for use as converter phases 334 on the north side of CPU 310. Here, by utilizing the typical VR topology, the higher efficiency and inductors may offset the higher temperatures experienced by the north-side converter phases, and may provide a smaller footprint and less airflow obstruction than would be the case where the north-side converter phases were designed with a TLVR topology. Note that, in FIG. 4, successive converter phases 410, 420, 430, 440, and 440 are designated as respective Phase1, Phase2, Phase3, Phase4, and Phase5. The converter phase designations may refer to the converter phases as they relate to the outputs of a converter phase driver device, and successive converter phases may typically be driven by successive outputs. However each of converter phases 410, 420, 430, 440, and 450 may be driven by any particular converter phase driver output, as needed or desired. Note that converter phase driver devices may typically provide for sequential ordering of the converter phase outputs, or the converter phase outputs may be randomly ascribed, as needed or desired.

Figure 5:
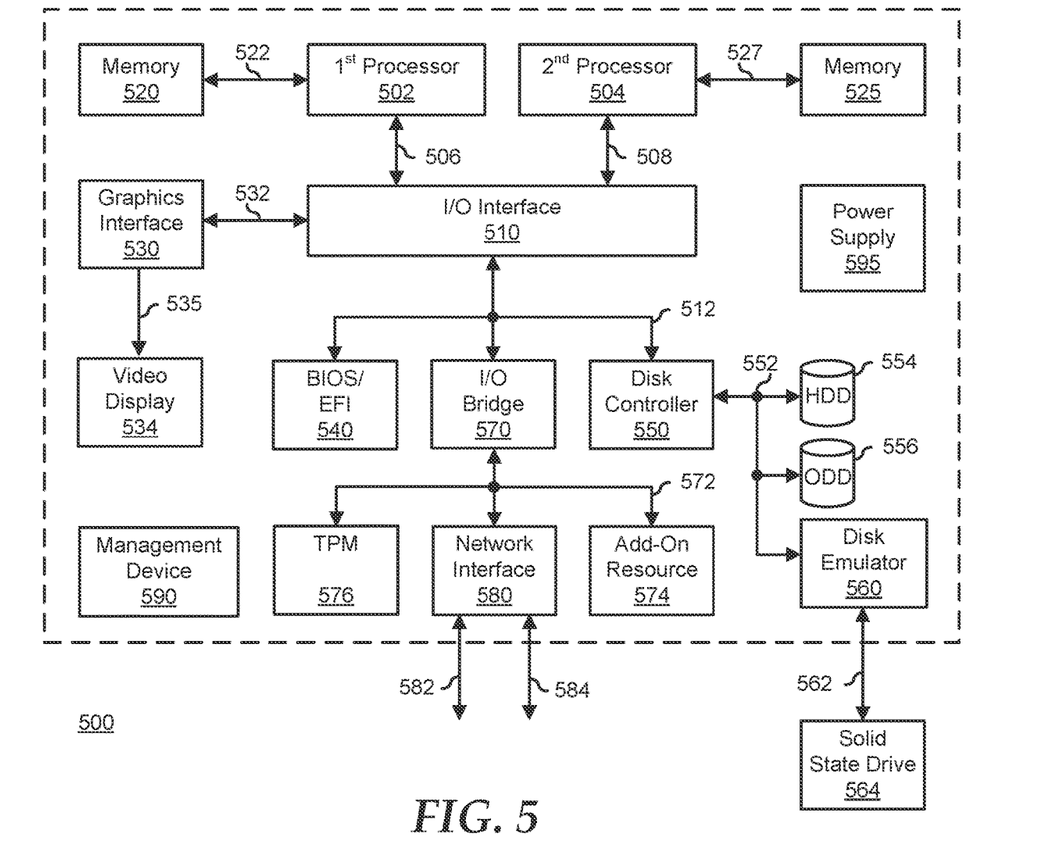
FIG. 5 is a block diagram illustrating a generalized information handling system according to another embodiment of the present disclosure.

FIG. 5 illustrates a generalized embodiment of an information handling system 500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532, and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A voltage regulator, comprising:
   a first portion including a first converter phase configured to receive an input voltage and to provide an output voltage on a power rail through a first inductor, wherein a first terminal of the first inductor is coupled to an output of the first converter phase, and a second terminal of the first inductor is coupled to the power rail;
   a second portion including:
      a second converter phase configured to receive the input voltage and to provide the output voltage on the power rail through a first primary winding of a first coupled inductor, the first coupled inductor including the first primary winding and a first secondary winding magnetically coupled to the first primary winding, wherein a first terminal of the first primary winding is coupled to an output of the second voltage converter, and a second terminal of the first primary winding is coupled to the power rail;

a third converter phase configured to receive the input voltage and to provide the output voltage on the power rail through a second primary winding of a second coupled inductor, the second coupled inductor including the second primary winding and a second secondary winding magnetically coupled to the second primary winding, wherein a first terminal of the second primary winding is coupled to an output of the third voltage converter, and a second terminal of the second primary winding is coupled to the power rail; and a compensation inductor, wherein a first terminal of the compensation inductor is coupled to a ground plane, a second terminal of the compensation inductor is coupled to a first terminal of the first secondary winding, a second terminal of the first secondary winding is coupled to a first terminal of the second secondary winding, and a second terminal of the second secondary winding is coupled to the ground plane;

wherein the first inductor is not magnetically coupled with either the first coupled inductor or the second coupled inductor.

2. The voltage regulator of claim 1, wherein the first portion further includes a fourth converter phase configured to receive the input voltage and to provide the output voltage on the power rail through a second inductor, wherein a first terminal of the second inductor is coupled to an output of the fourth converter phase, and a second terminal of the second inductor is coupled to the power rail.

3. The voltage regulator of claim 2, wherein the first portion is located on a downstream side of a central processing unit with respect to an airflow.

4. The voltage regulator of claim 3, wherein the second portion is located on an upstream side of the central processing unit with respect to the airflow.

5. The voltage regulator of claim 1, wherein the compensation inductor has an inductance of 150 nH.

6. The voltage regulator of claim 5, wherein the first and second primary windings and the first and second secondary windings have an inductance of 120 nH.

7. The voltage regulator of claim 1, wherein the compensation inductor, the first and second primary windings, and the first and second secondary windings have an inductance in the range of 50-1000 nH.

8. The voltage regulator of claim 1, further comprising a capacitor, wherein a first terminal of the capacitor is coupled to the power rail and a second terminal of the capacitor is coupled to the ground plane.

9. The voltage regulator of claim 8, wherein the power rail is coupled to provide power to a load.

10. The voltage regulator of claim 9, wherein the load is a central processing unit.

11. A method, comprising:
providing, on an information handling system, a first portion of a voltage regulator, the first portion including a first converter phase configured to receive an input voltage and to provide an output voltage on a power rail through a first inductor;
coupling a first terminal of the first inductor to an output of the first converter phase;
coupling a second terminal of the first inductor to the power rail;
providing, on the information handling system, a second portion of the voltage regulator, the second portion including a second converter phase configured to receive the input voltage and to provide the output voltage on the power rail through a first primary winding of a first coupled inductor, and a third converter phase configured to receive the input voltage and to provide the output voltage on the power rail through a second primary winding of a second coupled inductor, wherein the first coupled inductor includes the first primary winding and a first secondary winding magnetically coupled to the first primary winding, and wherein the second coupled inductor includes the second primary winding and a second secondary winding magnetically coupled to the second primary winding,
coupling a first terminal of the first primary winding to an output of the second voltage converter;
coupling a second terminal of the first primary winding to the power rail;
coupling a first terminal of the second primary winding to an output of the third voltage converter;
coupling a second terminal of the second primary winding to the power rail;
coupling a first terminal of a compensation inductor to a ground plane;
coupling a second terminal of the compensation inductor to a first terminal of the first secondary winding;
coupling a second terminal of the first secondary winding to a first terminal of the second secondary winding; and
coupling a second terminal of the second secondary winding to the ground plane;
wherein the first inductor is not magnetically coupled with either the first coupled inductor or the second coupled inductor.

12. The method of claim 11, wherein:
the first portion further includes a fourth converter phase configured to receive the input voltage and to provide the output voltage on the power rail through a second inductor;
the method further comprising:
coupling a first terminal of the second inductor to an output of the fourth converter phase; and
coupling a second terminal of the second inductor to the power rail.

13. The method of claim 12, wherein the first portion is located on a downstream side of a central processing unit with respect to an airflow.

14. The method of claim 13, wherein the second portion is located on an upstream side of the central processing unit with respect to the airflow.

15. The method of claim 11, wherein the compensation inductor has an inductance of 150 nH.

16. The method of claim 15, wherein the first and second primary windings and the first and second secondary windings have an inductance of 120 nH.

17. The method of claim 11, wherein the compensation inductor, the first and second primary windings, and the first and second secondary windings have an inductance in the range of 50-1000 nH.

18. The method of claim 11, further comprising:
coupling a first terminal of a capacitor to the power rail; and
coupling a second terminal of the capacitor to the ground plane.

19. The method of claim 18, further comprising coupling the power rail to provide power to a load.

20. An information handling system, comprising:
a load; and a voltage regulator configured to provide a power rail to provide power to the load, the voltage regulator including:
- a first portion including a first converter phase configured to receive an input voltage and to provide an output voltage on the power rail through a first inductor, wherein a first terminal of the first inductor is coupled to an output of the first converter phase, and a second terminal of the first inductor is coupled to the power rail;
- a second portion including:
  - a second converter phase configured to receive the input voltage and to provide the output voltage on the power rail through a first primary winding of a first coupled inductor, the first coupled inductor including the first primary winding and a first secondary winding magnetically coupled to the first primary winding, wherein a first terminal of the first primary winding is coupled to an output of the second voltage converter, and a second terminal of the first primary winding is coupled to the power rail; and
  - a third converter phase configured to receive the input voltage and to provide the output voltage on the power rail through a second primary winding of a second coupled inductor, the second coupled inductor including the second primary winding and a second secondary winding magnetically coupled to the second primary winding, wherein a first terminal of the second primary winding is coupled to an output of the third voltage converter, and a second terminal of the second primary winding is coupled to the power rail;
  - wherein a first terminal of the compensation inductor is coupled to a ground plane, a second terminal of a compensation inductor is coupled to a first terminal of the first secondary winding, a second terminal of the first secondary winding is coupled to a first terminal of the second secondary winding, and a second terminal of the second secondary winding is coupled to the ground plane, and wherein the first inductor is not magnetically coupled with either the first coupled inductor or the second coupled inductor.

* * * * *